Patented Jan. 27, 1942

2,271,083

UNITED STATES PATENT OFFICE 2,271,083

HYDROGENATION OF SUGARS OF TWO TO FOUR CARBON ATOMS

Eugene J. Lorand, Wilmington, Del., assignor to Hercules Powder Company, Wilmington, Del., a corporation of Delaware No Drawing. Application November 18, 1939, Serial No. 305,177

14 Claims. (Cl. 260—635)

This invention relates to a method of preparing polyhydric alcohols of 2-4 carbon atoms. More particularly it relates to the preparation of such alcohols by an improved method of hydrogenating sugars of 2-4 carbon atoms.

It is well known that sugars can be hydrogenated in aqueous solution to form their corresponding polyhydric alcohols. However, when the lower sugars of 2-4 carbon atoms, such as are formed by the condensation of formaldehyde, are hydrogenated as heretofore in aqueous solution, it is found that polymerization to 5-6 or more carbon atom compounds occurs under any conditions inducing hydrogenation without destructive action. A loss in yield of the desired lower polyhydric alcohols thus occurs. The difficulty is encountered even when no condensation catalysts such as are used in preparing lower sugars from formaldehyde are present during hydrogenation.

The use of substantially anhydrous solvents for the lower sugars largely prevents, I have found, condensation during hydrogenation to undesired 5-6 carbon atom compounds. However, hydrogenation in such solvents results in products having a lower hydroxyl content than is desired and expected.

It is the object of this invention to provide an improved method of hydrogenating lower sugars to polyhydric alcohols of 2-4 carbon atoms whereby condensation to compounds of five or more carbon atoms is minimized and a maximum hydroxyl content is achieved in the product. Other objects will be apparent as my invention is described.

Now in accordance with this invention I hydrogenate sugars of 2-4 carbon atoms in two stages. In the first stage, the sugars are subjected to suitable hydrogenating conditions while in solution in a substantially anhydrous solvent not affected by the reaction conditions. I then subject the incompletely hydrogenated product to a second hydrogenation step while in solution in an aqueous solution. Thereby a high hydroxyl content is attained in the resulting product.

In this manner, completely hydrogenated lower polyhydric alcohols, namely, ethylene glycol, glycerol and erythritol, are obtained with greatly diminished formation of higher carbon atom compounds. Hydrogenation in the first stage is accomplished with little condensation and is sufficient to prevent condensation in the second stage. The second stage is effective in producing a product of high hydroxyl content, which may be due, it is thought, to hydrolysis by water of unreducible acetal type linkages of the first stage product to aldehyde linkages which are readily hydrogenated.

The solvent which I use in the first stage of my hydrogenation process may be, for example, a monohydric alcohol such as methanol, ethanol, propanol, isopropanol, butanol, isobutanol etc., a polyhydric alcohol such as ethylene glycol, glycerol, trimethylene glycol, etc., dioxane, methoxyethanol, ethoxyethanol, etc., or any solvent or mixture of solvents which dissolve the sugars but are not hydrogenated under the conditions employed. Preferably, I use a volatile solvent such as methanol, as volatile solvents are readily removed between stages. However, ethylene glycol or glycerol or any solvent of low volatility which may be left in the product may be used, if desired.

The two hydrogenation steps of my process are carried out according to well-known procedures. A hydrogenation catalyst such as nickel on kieselguhr, nickel on alumina, Raney nickel, platinum, copper chromite, etc., suitably prepared, is employed. A nickel catalyst, particularly of the Raney nickel type, is preferred since it has been found that hydrogenation is more rapid and less condensation of the sugars takes place when nickel is used.

The time and temperature of hydrogenation and the hydrogen pressure may be varied widely, depending to some extent upon the catalyst employed. However, excessively high temperatures such as above about 200° C. are avoided as destructive hydrogenolysis occurs at the higher temperatures with loss in yield and the formation of compounds comparatively low in hydroxyl content. Using Raney nickel as the catalyst, for example, I find a hydrogen pressure between about 500 and about 10,000 lbs. per sq. in. to be suitable, a pressure between about 1500 and about 3000 lbs. per sq. in. being preferred. The temperature under these conditions may range from about 60° C. to about 160° C. and preferably a temperature in the range from about 100° C. to about 140° C. will be used for at least a portion of the hydrogenation period. Preferably the reaction is started at a low temperature such as 60-80° C. and the temperature raised to a higher temperature such as 120-140° C. toward the end of the hydrogenation period, this procedure being particularly desirable for the first stage. Using Raney nickel, the hydrogenation period will usually be from about one to about four hours for the first stage and from about one to about three hours for the second stage. In general, hydrogenating conditions may be varied within the catalyst chosen. For example, using noble metal catalysts such as platinum catalysts, hydrogenation pressures as low as atmospheric may be used if desired. The hydrogenation steps may be batch operations using an autoclave, preferably with agitation, or they may be continuous, passing the solution through a bed of catalyst, or passing the solution with catalyst in suspension through apparatus bringing it under suitable conditions.

The lower sugars being hydrogenated may be in a concentration of from about 10% to about 60% by weight, preferably from about 25% to about 40% by weight in the substantially anhydrous solution employed in the first stage. At the end of the first stage the anhydrous solvent is desirably removed from the product, for example by distillation at reduced pressure, and the residue is then dissolved in water. However, partial or complete removal of the first stage solvent, although preferable, is not necessary. The water added for the second stage may vary from about 0.5 part to about 10 parts, preferably from about 2 parts to about 4 parts by weight for each part of the sugars being hydrogenated. At the end of the second stage, the water and any remaining volatile solvent may be removed from the product by distillation at reduced pressure, if desired.

The lower sugars which I hydrogenate according to the process of this invention are such 2 to 4 carbon atoms sugars as, for example, glycol aldehyde, glyceraldehyde, dihydroxy acetone, ketotetrose, and the various aldotetroses in aldehyde or lactol forms. By lower sugars I mean sugars of 2-4 carbon atoms as distinguished from higher compounds of 5 or more carbon atoms. They will usually be obtained by the condensation of formaldehyde and will occur in admixture with each other. Where the condensation step is carried out in aqueous solution, it is necessary to remove the condensation catalyst and remove the water present by vacuum distillation. However, some additional condensation inevitably occurs while removing the water; hence, I prefer to utilize sugars condensed in an anhydrous solvent medium. The condensation solution may then be hydrogenated according to the method of this invention upon removal of the condensation catalyst by filtration or by precipitation followed by filtration or settling.

In example of the method according to this invention, there will now be given a specific procedure in which lower sugars prepared from formaldehyde are hydrogenated. The lower sugars were prepared by suspending 400 parts by weight of paraformaldehyde in 800 parts by weight of anhydrous methanol, adding 1 part of lead hydroxide, heating to solubilize the paraformaldehyde, heating further to a temperature of 124° C. in an autoclave whilst agitating the mixture. The combined heating operations required about one hour. The autoclave was held at 124° C. for about 10 minutes and then gradually cooled. The reaction product was then withdrawn from the autoclave and the catalyst removed.

A portion of the resulting solution of sugars in methanol corresponding to 60 parts of the original paraformaldehyde was then mixed with 30 parts by weight of methanol-wet Raney nickel catalyst. The mixture was hydrogenated in a high pressure autoclave at a hydrogen pressure of 1800 lbs. per sq. in. The autoclave was electrically heated, the temperature being raised to 138° C. over a period of two hours. The autoclave was rocked to provide agitation during the reaction. The autoclave was cooled and the pressure relieved. The methanol solution of partially converted product was drained from the catalyst and the methanol was distilled off at reduced pressure.

The product obtained in the first stage was then dissolved in 160 parts by weight of water and charged into the autoclave with 30 parts by weight of water-wet Raney nickel catalyst. Hydrogen was introduced at a pressure of 1700 lbs. per sq. in. The autoclave was heated to a temperature of 139° C. in 2.5 hours, rocking for agitation as in the first stage. It was then cooled, the pressure released, and the resulting solution filtered from the catalyst. The polyhydric alcohol mixture produced was recovered by distilling off the water at reduced pressure using a Widmer column.

To show the improvement obtained by the method according to this invention, an aliquot of the same formaldehyde condensate corresponding to 60 parts by weight of paraformaldehyde was hydrogenated in water solution. The formaldehyde condensation catalyst was removed from the lower sugars as before, the methanol in which the sugars were prepared was distilled off at reduced pressure, and the sugars were then dissolved in 160 parts by weight of water. The water solution was charged into the same autoclave used before with 30 parts by weight of water-wet Raney nickel catalyst. Hydrogenation was carried out at a hydrogen pressure of 1700 lbs. per sq. in., the temperature being raised to 140° C. over a period of two hours and being held there for two additional hours, rocking the autoclave as before. The autoclave was then cooled, the pressure released, and the solution filtered from the catalyst. The polyhydric alcohol mixture produced was recovered by distilling off the water at reduced pressure using a Widmer column as before.

The two products were compared by a viscosity test. Since the polyhydric alcohols increase in viscosity as the chain of carbon atoms increases in length, the relative viscosity is a very good indication of the relative proportion of higher polyhydric compounds present. The two products obtained were compared by measuring the time of flow between marks 60 millimeters apart in a tube 4.6 millimeters in inside diameter. The results were:

Seconds
Polyhydric alcohols by two-stage method of this invention _____ 51
Polyhydric alcohols by single-stage method__ 70

It is thus clear that the product of the two-stage method contains considerably less of the undesirable polyhydric alcohols of above 5 carbon atoms.

The products of the method of this invention may be used as humectants and in anti-freeze compositions. They are particularly suitable for nitration purposes to form explosives since they are low in higher polyhydric alcohols and in aldehydes and acetals all of which would render unstable the nitrated alcohols. The polyhydric alcohols may be separated from each other by fractionation at reduced pressures, if desired.

The term "substantially anhydrous" applied to solvents and solutions is meant herein and in the claims to indicate freedom from water except for the small quantities commonly associated with commercial forms of solvents, paraformaldehyde, etc.

The term "Raney nickel catalyst" in the description and claims refers to nickel catalyst of the type prepared in the manner described in the United States Patent 1,628,190 of Murray Raney, whereby an alloy of nickel with metals such as silicon and aluminum in various proportions, and in finely-divided form, is treated with a solvent for the silicon or aluminum which does not attack the nickel, thereby dissolving the silicon and aluminum from the alloy. The nickel remains in a finely-divided state. The solvent used in the treatment preferably is a caustic alkali such as caustic soda. After the solvent treatment the supernatant fluid is decanted and the residue, consisting of finely-divided nickel, is thoroughly washed with water.

The term "lower" applied herein to sugars, polyhydric alcohols, etc., refers to compounds of 2–4 carbon atoms; "higher" used similarly refers to compounds of 5 or more carbon atoms.

It will be understood that the details and examples hereinbefore set forth are illustrative and that the invention as broadly described and claimed is in no way limited thereby.

What I claim and desire to protect by Letters Patent is:

1. A method for the preparation of polyhydric alcohols of 2 to 4 carbon atoms, which comprises submitting to hydrogenation sugars of 2 to 4 carbon atoms dissolved in a substantially anhydrous solvent therefor until hydrogen absorption nearly stops and further submitting to hydrogenation the resulting partially converted product dissolved in a solvent containing substantial quantities of water on the basis of the partially converted product, the remaining constituents of the solvent being essentially non-reactive with the partially converted product.

2. A method for the preparation of polyhydric alcohols of 2 to 4 carbon atoms, which comprises submitting to hydrogenation sugars of 2 to 4 carbon atoms dissolved in a substantially anhydrous alcohol until hydrogen absorption nearly stops and further submitting to hydrogenation the resulting partially converted product dissolved in a solvent containing substantial quantities of water on the basis of the partially converted product, the remaining constituents of the solvent being essentially non-reactive with the partially converted product.

3. A method for the preparation of polyhydric alcohols of 2 to 4 carbon atoms, which comprises submitting to hydrogenation sugars of 2 to 4 carbon atoms dissolved in substantially anhydrous methanol until hydrogen absorption nearly stops and further submitting to hydrogenation the resulting partially converted product dissolved in a solvent containing substantial quantities of water on the basis of the partially converted product, the remaining constituents of the solvent being essentially non-reactive with the partially converted product.

4. A method for the preparation of polyhydric alcohols of 2 to 4 carbon atoms, which comprises submitting to hydrogenation sugars of 2 to 4 carbon atoms dissolved in substantially anhydrous ethanol until hydrogen absorption nearly stops and further submitting to hydrogenation the resulting partially converted product dissolved in a solvent containing substantial quantities of water on the basis of the partially converted product, the remaining constituents of the solvent being essentially non-reactive with the partially converted product.

5. A method for the preparation of polyhydric alcohols of 2 to 4 carbon atoms, which comprises submitting to hydrogenation sugars of 2 to 4 carbon atoms dissolved in a substantially anhydrous polyhydric alcohol until hydrogen absorption nearly stops and further submitting to hydrogenation the resulting partially converted product dissolved in a solvent containing substantial quantities of water on the basis of the partially converted product, the remaining constituents of the solvent being essentially non-reactive with the partially converted product.

6. A method for the preparation of polyhydric alcohols of 2 to 4 carbon atoms, which comprises submitting to hydrogenation sugars of 2 to 4 carbon atoms dissolved in substantially anhydrous ethylene glycol until hydrogen absorption nearly stops and further submitting to hydrogenation the resulting partially converted product dissolved in a solvent containing substantial quantities of water on the basis of the partially converted product, the remaining constituents of the solvent being essentially non-reactive with the partially converted product.

7. A method for the preparation of polyhydric alcohols of 2 to 4 carbon atoms, which comprises submitting to hydrogenation sugars of 2 to 4 carbon atoms dissolved in a substantially anhydrous solvent therefor until hydrogen absorption nearly stops and further submitting to hydrogenation the resulting partially converted product dissolved in a solvent containing substantial quantities of water on the basis of the partially converted product, the remaining constituents of the solvent being essentially non-reactive with the partially converted product, using a nickel catalyst in at least one of the hydrogenation steps.

8. A method for the preparation of polyhydric alcohols of 2 to 4 carbon atoms, which comprises submitting to hydrogenation sugars of 2 to 4 carbon atoms dissolved in a substantially anhydrous alcohol until hydrogen absorption nearly stops and further submitting to hydrogenation the resulting partially converted product dissolved in a solvent containing substantial quantities of water on the basis of the partially converted product, the remaining constituents of the solvent being essentially non-reactive with the partially converted product, using a nickel catalyst in at least one of the hydrogenation steps.

9. A method for the preparation of polyhydric alcohols of 2 to 4 carbon atoms, which comprises submitting to hydrogenation sugars of 2 to 4 carbon atoms dissolved in substantially anhydrous methanol until hydrogen absorption nearly stop and further submitting to hydrogenation the resulting partially converted product dissolved in a solvent containing substantial quantities of water on the basis of the partially converted product, the remaining constituents of the solvent being essentially non-reactive with the partially converted product, conducting both hydrogenations at a hydrogen pressure between about 500 and about 10,000 pounds per square inch, at a temperature between about 60° C. and about 160° C. in the presence of a Raney nickel catalyst.

10. A method for the preparation of polyhydric alcohols of 2 to 4 carbon atoms, which comprises submitting to hydrogenation sugars of 2 to 4 carbon atoms dissolved in a substantially anhydrous solvent therefor until hydrogen absorption nearly stops, removing the solvent, and further submitting to hydrogenation the resulting partially converted product dissolved in a solvent containing substantial quantities of water on the basis of the partially converted product, the remaining constituents of the solvent being essentially non-reactive with the partially converted product.

11. A method for the preparation of polyhydric alcohols of 2 to 4 carbon atoms, which comprises submitting to hydrogenation sugars of 2 to 4 carbon atoms dissolved in substantially anhydrous methanol until hydrogen absorption nearly stops, removing the methanol from the partially converted product, and further submitting to hydrogenation the said product dissolved in water, conducting both hydrogenations at a hydrogen pressure between about 500 and about 10,000 pounds per square inch, at a temperature between about 60° C. and about 160° C. in the presence of a Raney nickel catalyst.

12. A method for the preparation of polyhydric alcohols of 2 to 4 carbon atoms, which comprises submitting to hydrogenation sugars of 2 to 4 carbon atoms dissolved in substantially anhydrous ethanol until hydrogen absorption nearly stops and further submitting to hydrogenation the resulting partially converted product dissolved in a solvent containing substantial quantities of water on the basis of the partially converted product, the remaining constituents of the solvent being essentially non-reactive with the partially converted product, conducting both hydrogenations at a hydrogen pressure between about 500 and about 10,000 pounds per square inch, at a temperature between about 60° C. and about 160° C. in the presence of a Raney nickel catalyst.

13. A method for the preparation of polyhydric alcohols of 2 to 4 carbon atoms, which comprises submitting to hydrogenation sugars of 2 to 4 carbon atoms dissolved in substantially anhydrous ethanol until hydrogen absorption nearly stops, removing the ethanol from the partially converted product, and further submitting to hydrogenation the said product dissolved in water, conducting both hydrogenations at a hydrogen pressure between about 500 and about 10,000 pounds per square inch, at a temperature between about 60° C. and about 160° C. in the presence of a Raney nickel catalyst.

14. A method for the preparation of polyhydric alcohols of 2 to 4 carbon atoms, which comprises submitting to hydrogenation sugars of 2 to 4 carbon atoms dissolved in substantially anhydrous ethylene glycol until hydrogen absorption nearly stops and further submitting to hydrogenation the resulting partially converted product dissolved in a solvent containing substantial quantities of water on the basis of the partially converted product, the remaining constituents of the solvent being essentially non-reactive with the partially converted product, conducting both hydrogenations at a hydrogen pressure between about 500 and about 10,000 pounds per square inch, at a temperature between about 60° C. and about 160° C. in the presence of a Raney nickel catalyst.

EUGENE J. LORAND.